UNITED STATES PATENT OFFICE.

EDWIN C. ECKEL AND ARTHUR C. SPENCER, OF WASHINGTON, DISTRICT OF COLUMBIA.

PROCESS OF MAKING CEMENT.

1,209,135.  Specification of Letters Patent.  Patented Dec. 19, 1916.

No Drawing.  Application filed January 4, 1911. Serial No. 600,697.

*To all whom it may concern:*

Be it known that we, EDWIN C. ECKEL and ARTHUR C. SPENCER, citizens of the United States, residing at Washington, in the District of Columbia, have invented certain new and useful Improvements in Processes of Making Cement, of which the following is a specification.

This invention relates to processes of making cement; and it comprises a method of making cement wherein material comprising or composed of a potash feldspar is heated with calcareous material to fume off and expel and recover the potash and produce Portland cement; all as more fully set forth and as claimed.

While the proximate constitution of Portland cement is not definitely known, it is usually assumed to be in substance a mixture or combination of aluminate of lime and silicate of lime; alumina playing the part of an acid constituent. Other sesquioxids can replace the alumina in whole or in part. Ordinarily cement is made by heating silicate of alumina, which may be contained in clay or in slate, with calcareous material; as by calcining and clinkering a mixture of clay and limestone, naturally or artificially mixed. In this country it is usually made by running the dry pulverulent mixture down and through a rotating kiln, heated by a flame burning in the mouth. In the heating operation the limestone loses its carbon dioxid and the lime produced combines with the silica and with the alumina of the clay component to form cement clinker; a fritted or sintered agglomerate. These two operations of calcining and clinkering may be, and advantageously are, separated in point of time and space, occurring in spatially distinct portions of the stream of material passing through the kiln; but in ordinary practice they overlap, a third or more of the carbon dioxid remaining in the material at the point where clinkering begins. Much of the material employed rises as dust from the stream of fine powder going through the kiln and is carried forward by the current of flame gases; the losses in this way being sometimes quite high. Most of this dust is, of course, produced prior to the clinkering stage where the material begins to soften and frit, and most of it may be recovered in suitable dust chambers.

The reason for the employment of clay or slate, that is of silicate of alumina, in the customary operation is that when the silicate is broken up by the lime the silica and the alumina are both presented to the action of the lime in a molecular state of subdivision, or, so to speak, *in statu nascendi*. This is a very important matter since mutual reaction of bodies mixed together and in a powdered state is always very slow; and experience has shown that with the presence of free silica, that is, of sand, in the cement mixture the cement-forming reaction is very slow so far as this free silica is concerned no matter how fine the powdering of the silica. This is particularly true where, as in American practice, the components are dry-mixed.

We have found that the same results of securing a ready union of silica, alumina and lime can be attained by using potash feldspar in lieu of the clay or slate component in the mixture, with the additional advantages of the possibility of recovering potash as a valuable by-product and of forming a cement which in some respects is different from ordinary Portland. Potash feldspar or orthoclase, is a component of many rocks and occurs massive in many places. Its composition approaches more or less nearly $K_2O.Al_2O_3.6SiO_2$, some of the potash being frequently replaced by soda or other base. When pure it is composed of about 65 per cent. silica, 18 per cent. alumina and 17 per cent. potash. Such pure material will carry about 340 pounds of potash ($K_2O$) per short ton of 2000 pounds; and it is not difficult to find material running on the average 10 per cent. of potash or about 200 pounds per short ton. Upon treatment with free lime under the circumstances occurring in the cement kiln, much or most of this potash can be distilled or volatilized out of the mixture by a suitable adjustment of kiln conditions and the fumes can be recovered with the kiln dust. An admixture of some calcium chlorid with the cement materials under treatment under some circumstances facilitates this extrication and recovery of potash as it converts the potash into potassium chlorid which volatilizes with more readiness than the oxidized compounds of potassium.

The volatilized potassium compounds, whether chlorid or oxidized compounds, appear as a fume which under the usual laws tend to recondense upon solids suspended in the kiln gases; and the liberated potash may therefore be recovered with the kiln dust. As this dust is calcareous and therefore in itself is of fertilizing value, the recovered dust is a good fertilizer. The first dust coming from the upper portions of the kiln where only calcination is going forward, where the temperature is comparatively low and where the proportion of free lime is low, is less rich in potash than that coming from the lower portions where clinkering is beginning and the evolution of fume is more active, making it advisable, for the present purposes, to collect the two qualities of dust separately. For this reason it is advantageous to perform the cement making operation in a plurality of kilns or kiln sections, which may be separately fired or heated, having dust collecting means for each such kiln. By suitably conducting the operation, the main evolution of potash may be just before the clinkering or may be during the clinkering. In the latter event, the evolved potash fumes may go upward through the kiln with the flame gases to meet and collect upon the dust from the calcining sections. Or the potash and flame gases may be diverted prior to the formation of substantial amounts of dust and the potash otherwise collected; as by passing the flame gases through fume-collecting devices, such as suspended wires or bars, water sprays, etc. Where collected apart from kiln dust, the potash may be directly recovered as a commercial product; where collected with the dust, it may be similarly recovered by leaching and the like treatment of such dust.

It is usually advantageous as stated, to conduct the cement-making operation in a plurality of stages, and when this is done, most of the calcining may be performed in one kiln and the rest of the calcining and the clinkering in another, in order to obtain as concentrated a dust as possible from the latter. The dust from the first calcining is, or may be with proper operation, nearly barren of potash. In the clinkering the temperatures should not be high enough to produce fusion as this impairs the cement and hinders the evolution of potash. For this reason, and also to aid in the recovery of the potash, the clinkering operation may be advantageously protracted so as to drive off as much of the potash (which renders the mixture more fusible) prior to exposure to the final clinker-finishing high temperature. Vaporization takes place best from highly heated porous-surfaced clinker grains at a temperature just below the fusing or sintering point. With independently heated kiln sections this may be more easily secured than with a single kiln where the speed of rotation of the lower part of the kiln and the feed of material therethrough is dependent on the speed and feed in the upper part.

Feldspar has the further advantage for making cement that the ratio of alumina to silica is rather low so that the cement produced therefrom is, comparatively, slow-setting. In cement, it is usually presumed that the calcium aluminate is responsible for the first or quick set while the calcium silicate is responsible for the later hardening. By reducing the proportion of alumina a slow-setting cement is obtained. Cement from feldspar is, relatively, slow-setting. Feldspar is also comparatively free from iron and therefore makes a light colored cement while in the absence of iron there is no trouble experienced by reduction of ferric compounds during the heating. In ordinary cement, any reduction of the ferric iron present changes the character of the cement altogether. Ferrous iron is a base and replaces lime in the mixture while ferric iron acts as an acid component, replacing alumina. Feldspar is however rather hard and in some cases it is advisable to make a wet mix or slurry for this reason in fine-grinding. Where a plurality of kilns are employed in cement making operation, this hardness may however be obviated by postponing the fine grinding till after the first calcination. For example, the rough ground or crushed feldspar and limestone may be passed through a kiln and partially calcined. With this coarse material, little dust is evolved and the loss from dusting is not great while the limestone and feldspar are cracked and shattered, rendering fine grinding easier with a less consumption of power. Furthermore, in this preliminary calcination the limestone loses 40 per cent. or so of its weight so that the total weight of material to be fine ground is materially lessened.

In lieu of feldspar, rocks containing it such as granite, gneiss, syenite, etc., may be employed; but these rocks on the one hand contain much less potash than feldspar and on the other hand are apt to contain uncombined silica in the form of quartz which is difficult to convert into calcium silicate. Granite, for example, contains mica (which may contain considerable potash) feldspar and quartz. This quartz does not combine readily with the lime in the cement making operation. It is therefore advisable to use the feldspar rather than the rocks containing it. Where such rocks are employed, because of this presence of quartz or silica, it is better to make slurry rather than the dry mix to secure more intimate mixture. There are other minerals of substantially the composition of orthoclase such as microclin, etc., which for the present purposes may be regarded as ordinary feldspar and may be used for the present purposes. Potash micas are less advantageous owing to their physical form.

In a typical embodiment of the present invention, we may dry-grind a mixture of feldspar and limestone in the correct proportions for making Portland cement and pass the mixture down through a rotary kiln having heating means at its mouth. In this kiln the conditions may be such as to produce a partial or nearly complete calcination but without clinkering. The material coming from this first kiln may then be sent through another kiln, also having its own independent firing means, and there the calcination completed and the clinkering performed. Most of the potash will be found in the dust from this second kiln while there will be comparatively little in that from the first kiln. The dust from the second kiln may be collected in any suitable dust-collecting device and sold as such for a fertilizer; or treated to extract the potash, as by leaching and concentration. An amount of calcium chlorid corresponding to the potash present may be admixed with the materials either prior to introduction into the first or into the second kiln. This is not necessary but it often facilitates the work where relatively low clinkering temperatures are employed to obviate fusion. With feldspar, because of its relatively low melting point, the temperatures in the clinkering zone need not be, and advantageously are not, as great as with the usual mixtures containing clay or slate. The potash in the mixture makes it more fusible than a clay-lime mixture, though this ready fusibility disappears as the potash is fumed off. Where fine grinding is to be postponed till after the preliminary calcination, the coarsely crushed material may be fed down through the calcining kiln and the calcined material then reground. Its shattering and disintegration may be assisted by a limited addition of water or steam, not enough being added to cause the material going into the second kiln to be at all moist, the calcium chlorid (when used) being added with this water prior to sending the materials into the second kiln.

The calcination may of course be performed in a rotary and the clinkering in a stationary furnace; or the reverse. The material may be first calcined in a vertical kiln and then finished in a rotary. Or the lime may be first calcined in the ordinary manner and then mixed with the feldspar. The clinker finally produced is of course reground in the usual way to make the usual commercial cement.

Many other modifications are possible within the purview of our invention.

What we claim is:—

1. The process of making cement clinker and by-products which comprises mixing comminuted potash feldspar with calcareous material in proportions to make cement clinker, heating the mixture to a temperature sufficient to clinker but insufficient to produce fusion for a length of time sufficient to fume off potassium compounds and recovering the potash fumes evolved in said heating.

2. The process of making cement and by-products which comprises converting a mixture comprising calcareous material and potash feldspar into cement clinker by heat in a plurality of stages at different temperatures, one such temperature being high enough to fume off the potassium compounds and recovering the potassium compounds evolved in the stage of high heating.

3. The process of making cement and by-products which comprises passing a mixture comprising calcareous material and potash feldspar through a rotary kiln under conditions adapted to make cement clinker while fuming off substantially all the potassium compounds and recovering the fumes of potassium compounds so volatilized.

4. The process of making cement and by-products which comprises passing a mixture comprising calcareous material and potash feldspar through a rotary kiln under conditions adapted to make cement clinker while fuming off substantially all the potash as potassium compounds and separately collecting the dust and fume evolved in different stages of the operation.

5. The process of making cement and by-products which comprises passing a mixture comprising calcareous material and potash feldspar through successive sections of a rotary kiln and separately recovering the dust and fume evolved in each such section.

6. The process of making cement and by-products which comprises passing a mixture comprising calcareous material and potash feldspar through successive sections of a rotary kiln and separately recovering the dust and fume evolved in each such section, each such section being separately heated.

7. The process of making cement and by-products which comprises passing a mixture comprising calcareous material and potash feldspar through successive sections of a rotary kiln and separately recovering the dust and fume evolved in each such section, each such section being separately heated and the material being reground in passing between section and section.

8. In the manufacture of cement and by-products the process which comprises converting a mixture comprising potash feldspar, calcareous material and a chlorid into cement clinker by heat and recovering the potassium compounds evolved in the heating.

9. The process of making available potash salts and cementitious material which comprises heat-treating potash-carrying silicious material and calcareous material in cement-forming proportions, as a traveling stream, in contact with an opposed current of heated gases and in the presence of an intentionally-added body capable of reacting with the alkali of the silicate and of forming a relatively volatile alkali metal compound, and in collecting said volatile compound; said stream being of predetermined length and width and of predetermined and graduated temperature, whereby potassium compounds are volatilized and the residual material clinkered.

10. The process of making potash salts and cementitious material which comprises subjecting to a progressively increasing temperature a body of calcareous material and silicious material carrying potash, in cement forming proportions, as a traveling stream in contact with an opposed current of heated gases, and in the presence of a body capable of reacting with the alkali of the silicate; whereby a relatively volatile potassium compound is formed; said body being present in an amount sufficient to react with at least the major portion of said alkali; in volatilizing and collecting the said potassium compound and in substantially separately collecting the residual material as cement clinker.

11. The process of making soluble potash salts and Portland cement which comprises intimately mixing finely-ground potash silicate rock material with calcium chlorid, the latter being present in an amount sufficient to furnish chlorin for at least substantially the entire amount of potash present in said rock material, combining the mixture with other materials to form a Portland cement raw mix, heating to form Portland cement clinker and potassium chlorid and separately collecting the clinker and potash salts.

12. Process of manufacturing simultaneously alkali metal compounds and hydraulic cement, which consists essentially in mixing in a pulverized state a double silicate of aluminum and an alkali metal, with calciferous matters containing at least sufficient calcium to replace the combined alkali metal and capable of liberating compounds of such alkali metal, heating the mixture until volatile alkali metal compounds are volatilized and the residue forms cement clinker, collecting the alkali metal compounds and grinding the residue to cement, substantially as and for the purpose set forth.

13. The process of simultaneously manufacturing cement clinker and alkali metal compounds, which comprises reacting under suitable heat conditions, upon a mineral containing a double silicate of aluminum and an alkali metal, with calciferous material containing sufficient calcium to replace the alkali metal in said mineral and capable of setting alkali metal compounds free, whereby said alkali metal compound will be volatilized, leaving a cement clinker residue.

14. In the simultaneous manufacture of alkali metal compounds and hydraulic cement, the process which comprises reacting upon a double silicate of aluminum and a metal of the alkalis with a calciferous compound containing sufficient calcium to replace the alkali metal in said mineral and capable of liberating alkali metal compounds, said compound being in quantity sufficient to replace substantially all of said alkali metal in the mineral, such replacement taking place under sufficient heating to volatilize the alkali metal compound liberated and leave a residue of cement material, and separately collecting the residue and the volatilized materials.

15. The process of manufacturing simultaneously alkali metal compounds and hydraulic cement, which comprises reacting upon a double silicate of aluminum and a metal of the alkalis, with calciferous material sufficient to liberate alkali metal compounds, such replacement taking place under sufficient heating to volatilize the alkali metal compounds so liberated and leave a residue of cement material and separately collecting the residue and the volatilized materials.

16. Process of manufacturing simultaneously alkali and hydraulic cement, which consists essentially in mixing in a pulverized state a double silicate of aluminum and an alkali metal, with calciferous matters containing at least sufficient calcium to replace the combined alkali metal and capable of liberating alkali metal compounds, heating the mixture until the alkali metal compounds are volatilized and the residue forms cement clinker, collecting the alkali metal compounds and grinding the residue to cement, substantially as and for the purpose set forth.

17. Process of manufacturing simultaneously alkali and hydraulic cement, which consists essentially in mixing in a pulverized state a double silicate of aluminum and an alkali metal with calciferous material containing sufficient calcium to replace the alkali metal and capable of liberating alkali metal compounds and in such proportions that the percentage of combined sesquioxids constitute at least one-fifth of the percentage of combined silicic acid, heating the mixture until the alkali metal compounds are volatilized and the residue forms cement clinker, collecting the alkali metal compounds and grinding the residue to cement, substantially as and for the purpose set forth.

18. Process of manufacturing simultaneously alkali and hydraulic cement, which consists essentially in mixing in a pulverized state of double silicate of aluminum and an oxid of an alkali metal with calciferous material containing calcium at least sufficient to replace the alkali metal and capable of liberating alkali metal compounds, heating the mixture until the alkali metal compounds are volatilized and the residue forms cement clinker, in the presence of gases which are capable of reacting with the volatilized alkali, collecting the alkali combination and grinding the residue to cement, substantially as and for the purpose set forth.

19. Process of manufacturing simultaneously alkali and hydraulic cement, which consists in mixing in a pulverized state essentially a double silicate of aluminum and an alkali metal with calciferous material having at least sufficient calcium to replace the combined alkali metal and capable of liberating alkali metal compounds, heating the mixture until the alkali metal compounds are volatilized and the residue forms cement clinker, absorbing the alkali metal compounds by means of water, and grinding the residue to cement, substantially as and for the purpose set forth.

20. The process of simultaneously manufacturing cement clinker and alkali, which comprises reacting, under suitable heat conditions, upon a mineral containing a double silicate of aluminum and an alkali metal, with calciferous material containing sufficient calcium to replace the alkali metal in said mineral and capable of setting alkali metal compounds free, whereby said alkali metal compounds will be volatilized, leaving a cement clinker residue.

21. In the simultaneous manufacture of alkali and hydraulic cement, the process which comprises reacting upon a double silicate of aluminium and a metal of the alkalis with a calciferous material containing sufficient calcium to replace the alkali metal therein and capable of liberating the alkali as alkali metal compounds, said material being in quantity sufficient to replace substantially all of said alkali metal, such replacement taking place under sufficient heating to volatilize the alkali metal compounds liberated and leave a residue of cement material, and separately collecting the residue and the volatilized materials.

22. The process of manufacturing simultaneously alkali and hydraulic cement, which comprises reacting upon a double silicate of aluminum and a metal of the alkalis, with calcium compounds sufficient to replace and liberate alkali metal compounds, such replacement taking place under sufficient heating to volatilize the alkali metal compounds liberated and leave a residue of cement material, and separately collecting the residue and the volatilized materials.

23. A process of manufacturing simultaneously alkali and hydraulic cement, which consists essentially in mixing in pulverized state a double silicate of aluminium and an alkali metal with calciferous material having at least sufficient calcium to replace the combined alkali metal and capable of liberating alkali metal compounds, heating the mixture to the temperature of volatilizing of the alkali metal compounds in a current of flame gases, and separately collecting the residue and the volatilized materials.

24. Process of manufacturing simultaneously alkali and hydraulic cement, which consists essentially in mixing in pulverized state a double silicate of aluminium and an alkali metal with calciferous material having at least sufficient calcium to replace the combined alkali metal and capable of liberating alkali metal compounds, heating the mixture to the temperature of volatilizing of the alkali metal compounds in a current of flame gases, and separately collecting the residue and the volatilized materials.

25. A process of producing cement and soluble potash salt, which comprises (a) heating a mixture containing feldspar and a calcareous agent, (b) intimately mixing the so heated product with a calcium salt of an acid which produces a soluble and comparatively easily volatile salt with potassium, (c) thereafter heating the so obtained mixture in a sub-divided condition, to a clinkering temperature, thereby producing a cement clinker and volatilizing the potassium in the form of a readily volatile salt, and (d) thereafter separating the volatilized potassium salt from the remaining gases.

26. A process of producing cement and soluble potassium compounds which comprises (a) heating a mixture including a potassium containing silicate mineral and a calcareous agent under conditions such as to avoid volatilization of a substantial portion of the potassium compounds contained therein, (b) adding, to the resulting product, water and a salt of an acid which produces a soluble and comparatively easily volatilizable salt with potassium, (e) thereafter heating the so obtained product, in a sub-divided condition, to a clinkering temperature and thereby producing a cement clinker and volatilizing the potassium in the form of a relatively volatile salt, and (d) then separating said volatilized potassium salt from the gases present.

27. Process of manufacturing simultaneously alkali and hydraulic cement, which consists essentially in mixing in a pulverized state a double silicate of aluminum and an alkali metal, with calciferous matters containing at least sufficient calcium to replace the combined alkali metal and capable of liberating alkali metal compounds, heating the mixture until an alkali metal compound is volatilized and the residue forms cement clinker, collecting the alkali metal compound and grinding the residue to cement, substantially as and for the purpose set forth.

28. In the simultaneous manufacture of alkali and hydraulic cement, the process which comprises reacting upon a double silicate of aluminum and a metal of the alkalis with a calciferous material containing sufficient calcium to replace the alkali metal in said mineral and capable of liberating an alkali metal compound, said material being in quantity sufficient to replace substantially all of said alkali metal in the mineral, such replacement taking place under sufficient heating to volatilize the alkali metal compound liberated and leave a residue of cement material, and separately collecting the residue and the volatilized materials.

29. The process of manufacturing simultaneously alkali and hydraulic cement, which comprises reacting upon a double silicate of aluminum and a metal of the alkalis, with a calcium compound in amount sufficient to replace the alkali metal by calcium and liberate an alkali metal compound, such replacement taking place under sufficient heating to volatilize the alkali compound liberated and leave a residue of cement material and separately collecting the residue and the volatilized materials.

In testimony whereof, we affix our signatures in the presence of witnesses.

EDWIN C. ECKEL.
ARTHUR C. SPENCER.

Witnesses:
K. P. McElroy,
R. F. Steward.

Copies of this patent may be obtained for five cents each, by addressing the "Commissioner of Patents, Washington, D. C."